US009982675B2

(12) United States Patent
Jensen et al.

(10) Patent No.: US 9,982,675 B2
(45) Date of Patent: May 29, 2018

(54) METHOD FOR CONTROLLING THE POWER OF A PUMP DEVICE AND PUMP DEVICE (71) Applicant: GRUNDFOS HOLDING A/S, Bjerringbro (DK)

(72) Inventors: Kim Hulegaard Jensen, Rødkærsbro (DK); Lars Sund Mortensen, Aars (DK); Jan Carøe Aarestrup, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 693 days.

(21) Appl. No.: 14/501,576

(22) Filed: Sep. 30, 2014

(65) Prior Publication Data
US 2015/0093253 A1 Apr. 2, 2015

(30) Foreign Application Priority Data
Oct. 1, 2013 (EP) .................................... 13186962

(51) Int. Cl.
*F04D 15/00* (2006.01)
*H02H 7/08* (2006.01)
(Continued)

(52) U.S. Cl.
CPC ..... *F04D 15/0077* (2013.01); *F04D 15/0066* (2013.01); *H02H 3/006* (2013.01);
(Continued)

(58) Field of Classification Search
CPC ............. F04D 15/0077; F04D 15/0066; F04D 15/0263; H02H 3/006; H02H 7/0833;
(Continued)

(56) References Cited

U.S. PATENT DOCUMENTS 5,158,436 A * 10/1992 Jensen ................. H02H 7/0833
417/32
5,287,123 A * 2/1994 Medin .................... B41J 11/002
347/102
(Continued)

FOREIGN PATENT DOCUMENTS

EP 2 1574 378 A1 2/2010
EP 2154378 A1 * 2/2010 .............. F04B 23/02
(Continued)

OTHER PUBLICATIONS

Machine Translation of EP2154378A1 description dated Feb. 17, 2010.*

*Primary Examiner* — Nathan Zollinger
(74) *Attorney, Agent, or Firm* — McGlew and Tuttle, P.C.

(57) ABSTRACT

A method for controlling the power limit of a pump device includes controlling the power limit of the pump device on the basis of a pump media temperature $T_m$ and an ambient temperature $T_a$ measured inside a control box of the pump device. A pump device, in particular a centrifugal pump, is driven by a motor. The motor is controlled by a control box wherein temperature sensors for measuring a media temperature $T_m$ and an ambient temperature $T_a$ are arranged in the control box so as to control the power limit of the pump device depending on the measured media temperature $T_m$ and an ambient temperature $T_a$.

20 Claims, 8 Drawing Sheets (51) Int. Cl.
*H02H 7/085* (2006.01)
*H02H 3/00* (2006.01)
*H02P 29/032* (2016.01)

(52) U.S. Cl.
CPC ........ *H02H 7/0833* (2013.01); *H02H 7/0852* (2013.01); *H02P 29/032* (2016.02)

(58) Field of Classification Search
CPC ................ H02H 7/0852; H02P 29/032; F04B 2201/0801; F04B 2203/0208
See application file for complete search history.

(56) References Cited

U.S. PATENT DOCUMENTS

| | | | |
|---|---|---|---|
| 6,527,517 B1 * | 3/2003 | Wallrafen | F04B 53/16 417/32 |
| 8,479,513 B2 * | 7/2013 | Shimizu | F02B 37/10 60/607 |
| 8,593,099 B2 * | 11/2013 | Shibuya | F04B 39/121 318/461 |
| 2010/0270798 A1 * | 10/2010 | Poulsen | F03D 7/0224 290/44 |

FOREIGN PATENT DOCUMENTS

| | | |
|---|---|---|
| JP | H04 21386 A | 1/1992 |
| JP | 2009 136061 A | 6/2009 |
| WO | 2005/075827 A1 | 8/2005 |

* cited by examiner

METHOD FOR CONTROLLING THE POWER OF A PUMP DEVICE AND PUMP DEVICE

CROSS REFERENCE TO RELATED APPLICATIONS

This application claims the benefit of priority under 35 U.S.C. § 119 of European Patent Application EP 13 186 962.0 filed Oct. 1, 2013, the entire contents of which are incorporated herein by reference.

FIELD OF THE INVENTION

The invention relates to a method for controlling the power of a pump device and to a pump device, in particular, a centrifugal pump driven by a motor wherein the motor is controlled by a control box.

BACKGROUND OF THE INVENTION

In electronics controlled centrifugal pumps known in prior art, the input power has to be restricted in order to ensure that a certain temperature is not exceeded which may cause damage to the various electronic components of the centrifugal pump or a shutdown of the latter. This restriction of the input power, i.e. the input power limit, is assessed in consideration of a high media temperature or a high ambient temperature. Therefore, to obtain a highly reliable product, the worst case scenario has to be used as the limit for the power. Thus, the centrifugal pump is rated for continuous operation with a specific load profile in an environment where the media and ambient temperatures are given. A fixed power limit is determined which means that always, this power limit is used during operation according to which a predetermined maximum power limit is never exceeded although the actual media and/or ambient temperature might still be below the limit which might cause damage. Thus, in applications known from prior art, the use of a fixed power limit restricts the performance of the pump.

SUMMARY OF THE INVENTION

Therefore, it is an object of present invention to provide a method for controlling the power of a pump device and a corresponding pump device according to which the full potential of the pump performance is usable.

According to the invention, a method for controlling a power limit of a pump device is provided wherein the power limit of the pump device is controlled on the basis of a pump media temperature and an ambient temperature measured inside a control box of the pump device. By determining the temperature continuously, a "temperature controlled power limit" may be implemented. Thus, under certain conditions, as e.g., at low media and/or low ambient temperature, more power than the maximal power used for a fixed power limit may be applied to the pump at least for a period of time which in turn during this time period may then achieve a higher performance. This may be very useful, for example, in fresh water module (FWM) systems in which pump regulation sometimes is performed with lukewarm water, and in which a high flow is required to service the customer with the correct amount of hot water, or in solar applications (drain back systems) where a high head is needed to fill the system in the starting phase and to maintain the systems' performance. Also, e.g. with respect to solar thermal heating systems, the combination of a high collector output temperature and a high ambient temperature may cause the temperature in the control box to exceed a rated limit of the electronic components. If the temperature is continuously determined during operation and thereby, a temperature-dependent control of the power is enabled, the maximum power limit may also be reduced in order to avoid any shut down or life time reduction of the temperature-critical electronic components. Thus, by the inventive configuration, always the full potential of the pump performance according to differing pump loads and varying media and ambient temperatures may be exploited.

According to a preferred embodiment, the measured media and ambient temperatures are used in a thermal model stored in the control box to determine temperatures of one or more pump components, in particular electronic components, in the pump device. Thereby, the most important factors which may cause damage or a shutdown are monitored on the basis of which the control of the power limit is then carried out. The thermal model of the temperature of critical electronic components may be programmed into the control box, and the thermal model enables an estimation of the temperature of each of the critical components.

Further, the power limit of the pump device may be controlled such that if the temperature of all pump critical components of the pump device determined on the basis of the thermal model is below their maximum temperature, the input power limit of the pump device is at least temporarily raised above a nominal power limit.

Also, the power limit of the pump device may be controlled such that if the temperature of one or more pump critical components of the pump device determined on the basis of the thermal model is/are above its/their maximum temperature, the input power limit is at least temporarily reduced below a nominal power limit.

In- and/or out-power (power in and/or power out) related quantities, for example, mains power, current, and voltage and/or loss related states, for example, ON/OFF state of the display, clamped switch strategy state of the inverter ON/OFF, external output ON/OFF, LED array ON/OFF, of one or more components in the pump device may be used as input for the thermal model.

Also, with respect to a specific case which is well suited for embedded implementation, the following temperature model may be used:

$$T_{comp1} = a_1 T_a + a_2 T_m + a_3 P_{DC} + \theta_{in} \cdot Y_{in} + \theta_{out} \cdot Y_{out} + \theta_C X_C$$

wherein:

$a_1 \ldots a_3$ are temperature model coefficients;
$P_{DC}$ is the power consumption in the intermediate circuit;
$\theta_{in}$ is a vector of coefficients related to $Y_{in}$;
$\theta_{out}$ is a vector of coefficients related to $Y_{out}$;
$Y_{in}$ is a vector of input related quantities;
$Y_{out}$ is a vector of output related quantities;
$X_C$ is a vector of component states; and
$\theta_C$ is a vector of coefficients related to $X_C$.

According to another embodiment, the thermal model expresses the temperature of the one or more components further as a function of intermediate voltage, intermediate power, display state vector, and inverter state vector which is 0 when the strategy for generating the motor voltage is in clamped switch state, i.e., that during the generation of the sinusoidal motor voltage, when doing pulse width modulation (PWM) of the DC link voltage with a fast switching frequency, some of the inverter switches are turned on in more than one PWM switch period. On the other hand, the inverter state vector is 1, when generating the motor voltage without using clamping of inverter switches. Thus, during operation of the centrifugal pump, the power, voltage, and the media and ambient temperatures are measured and the maximum power limit is calculated making sure that the temperatures for the critical or for selected components will not exceed their respective limits so as to not cause any damage.

Preferably, the media and ambient temperature measurements are steady state measurements.

According to still a further embodiment, the model structure of the thermal model is expressed by the formula:

$$T=a_1T_a+a_2T_m+a_3P_{DC}+a_4V_{DC}+a_5 \cdot X_D+a_6 \cdot X_I$$

wherein:
T is the temperature of the one or more components;
$a_1$-$a_6$ are temperature model coefficients;
$T_a$ is the ambient temperature;
$T_m$ is the media temperature;
$P_{DC}$ is the power consumption in the intermediate circuit,
$V_{DC}$ is the intermediate circuit voltage
$X_D$ is the display state vector and
$X_I$ is the inverter state vector.

Moreover, according to the invention, a pump device, in particular centrifugal pump, is provided, the pump device being driven by a motor, the motor being controlled by a control box, wherein a temperature sensor for measuring a media temperature Tm and a temperature sensor for measuring the ambient temperature Ta are arranged in the control box so as to control the power limit of the pump depending on the measured media temperature and an ambient temperature. This enables that always the full pump potential and performance may be used without the risk of damage of electronic components due to overheating, as outlined above.

A thermal model may be programmed in the control box, which is used to determine a temperature of one or more pump components, in particular electronic pump components, as a function of the measured media and ambient temperatures. Specifically, the measurements effected by the two sensors allow for a mathematical model to be developed which expresses the temperature of the electronic components as a function of the measured temperatures, and, for example, input voltage, input power, and motor control state vector. If the type of the temperature sensors or their placement inside the control box is changed, a new model may be developed. On the basis of the measured temperatures according to which the model may be developed, a "temperature controlled power limit" is enabled which always allows for the most efficient operation of the pump device, as already outlined above.

In- and out-power related quantities and/or loss related states of one or more components in the pump device may be used as input for the thermal model. For example, during the operation of the pump, the power consumption, the mains input voltage, the media temperature, the ambient temperature, the motor current may be determined as the above mentioned in- and out-power related quantities and loss related states.

The invention is not limited to the described embodiments which can be modified in many ways.

Preferred embodiments of the present invention will now be more particularly described by way of example with reference to the accompanying drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1A:
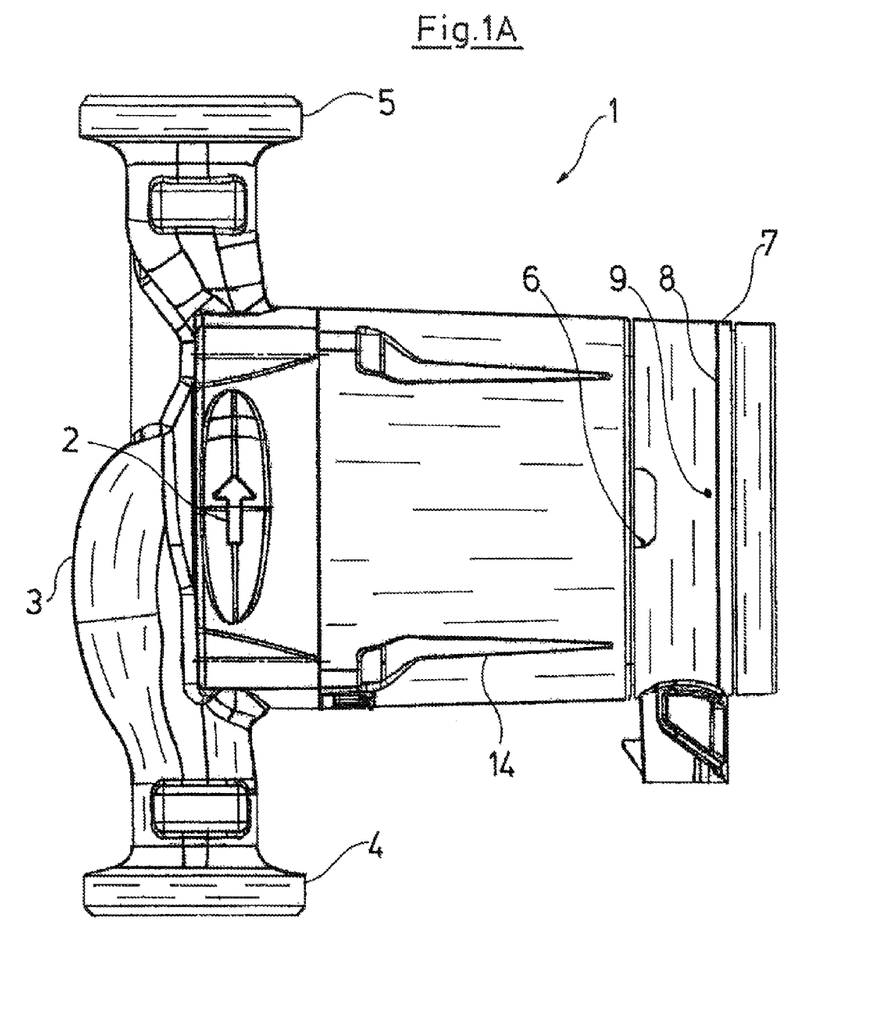
FIG. 1A is a partial cross-sectional side view of a pump device according to an embodiment of the invention.
Figure 1B:
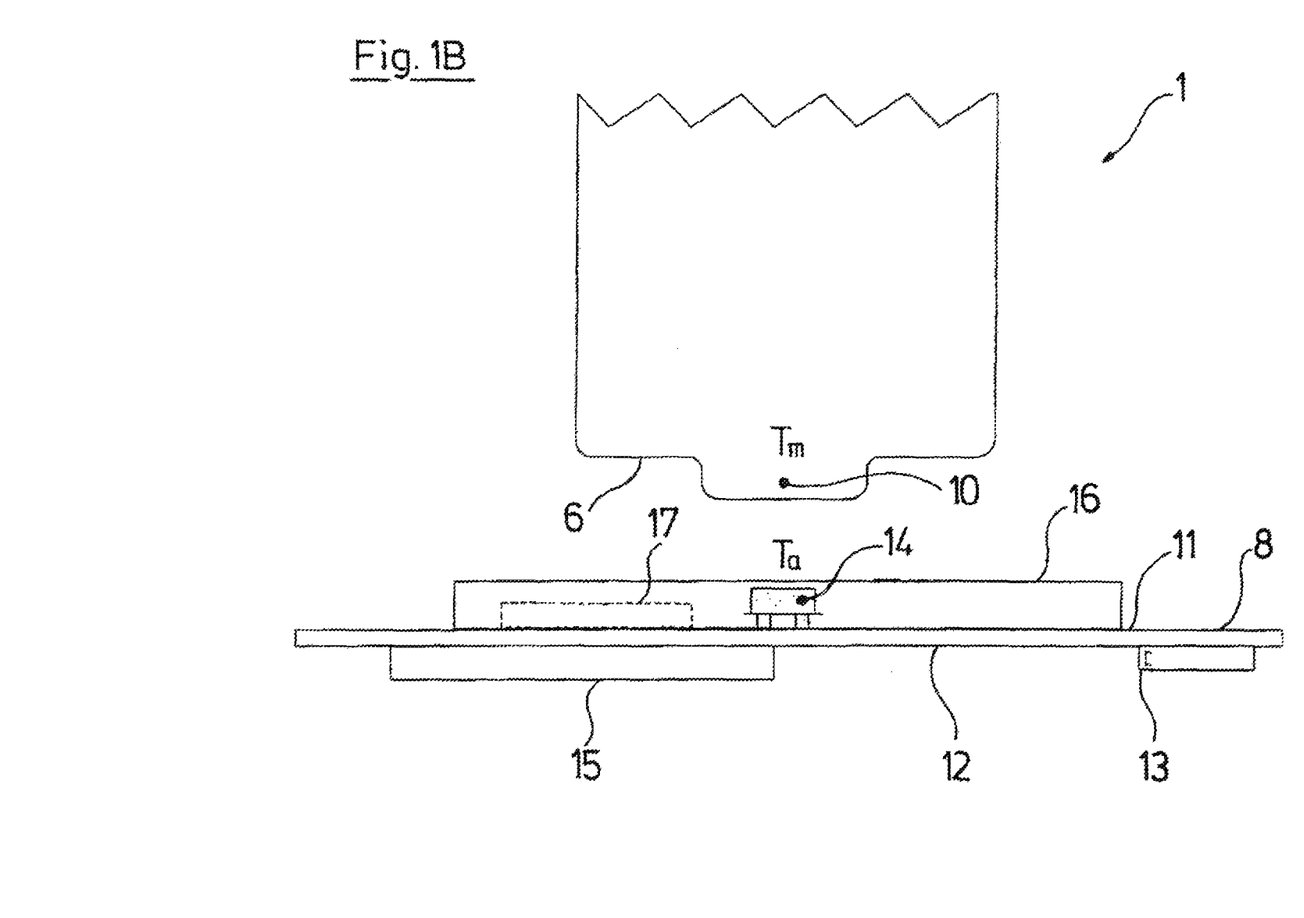
FIG. 1B is an enlarged partial side view of a pump device according to the embodiment of FIG. 1A.

Referring to the drawings in particular, FIG. 1A and FIG. 1B show respective views of a pump device 1 according to an embodiment wherein FIG. 1A is a partial cross-sectional side view of the pump device 1, and FIG. 1B is an enlarged partial side view of the pump device 1 shown in FIG. 1A. As can be seen in FIG. 1A, the pump device 1 is configured as a centrifugal pump whereby the direction of the fluid flow of the pumped media through the pump device 1 is indicated by the arrow 2. The various pump components are arranged inside a housing 3 with an inlet 4 on the suction side and an outlet 5 on the pressure side of the pump device 1. Indicated by reference numeral 6 is the top of a rotor can (housing) of the pump device 1 on which a control box 7 is placed.

Inside the control box 7, a printed circuit board 8 is provided which is surrounded by air 9 having a specific temperature $T_a$. Inside the control box 7, a dual temperature sensor 14, for measuring the media temperature $T_m$ and the ambient temperature $T_a$, is mounted wherein the sensor measures the media temperature $T_m$ of the media flowing through the pump housing 3, by infrared radiation of the rotor can 6 for example at the point indicated by reference numeral 10, and the same sensor measures the ambient temperature $T_a$. As can be seen in FIG. 1B, which shows the top of the rotor can 6 adjacent to the printed circuit board 8, on the latter, various electronic components are placed on its top side 11 as well on its bottom side 12. Reference numeral 13 indicates a rectifier bridge, reference numeral 15 indicates a power module, reference numeral 16 indicates a liquid crystal display (LCD), and reference numeral 17 indicates a microcontroller as electronic components.

Figure 2:
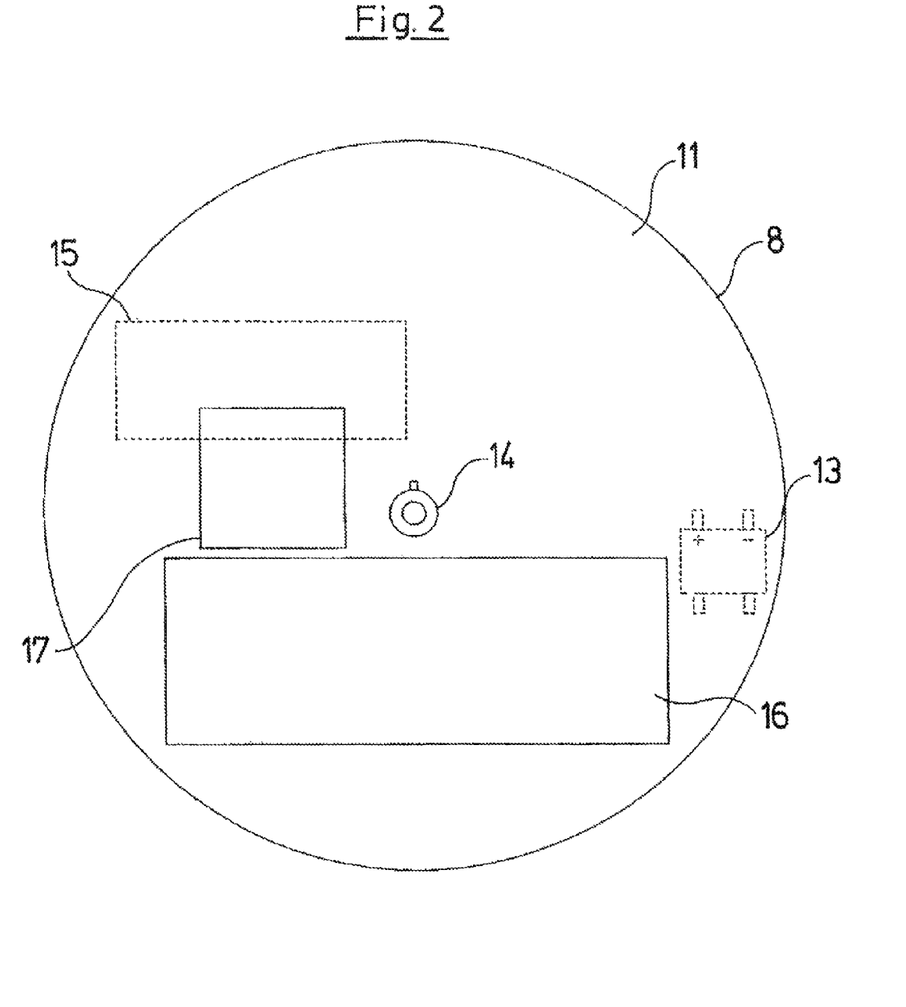
FIG. 2 is a top view of a printed circuit board of the control box of the pump device shown in FIG. 1A and FIG. 1B.

FIG. 2 shows a top view of a printed circuit board 8 of the control box 7 of the pump device 1 shown in FIG. 1A and FIG. 1B. On the top side 11, indicated by solid lines, are placed the LCD 16, the microcontroller 17, and a dual temperature sensor 14. On the bottom side 12 of the printed circuit board 8 are placed the rectifier bridge 13 and the power module 15 which are indicated by the dashed lines.

Figure 3:
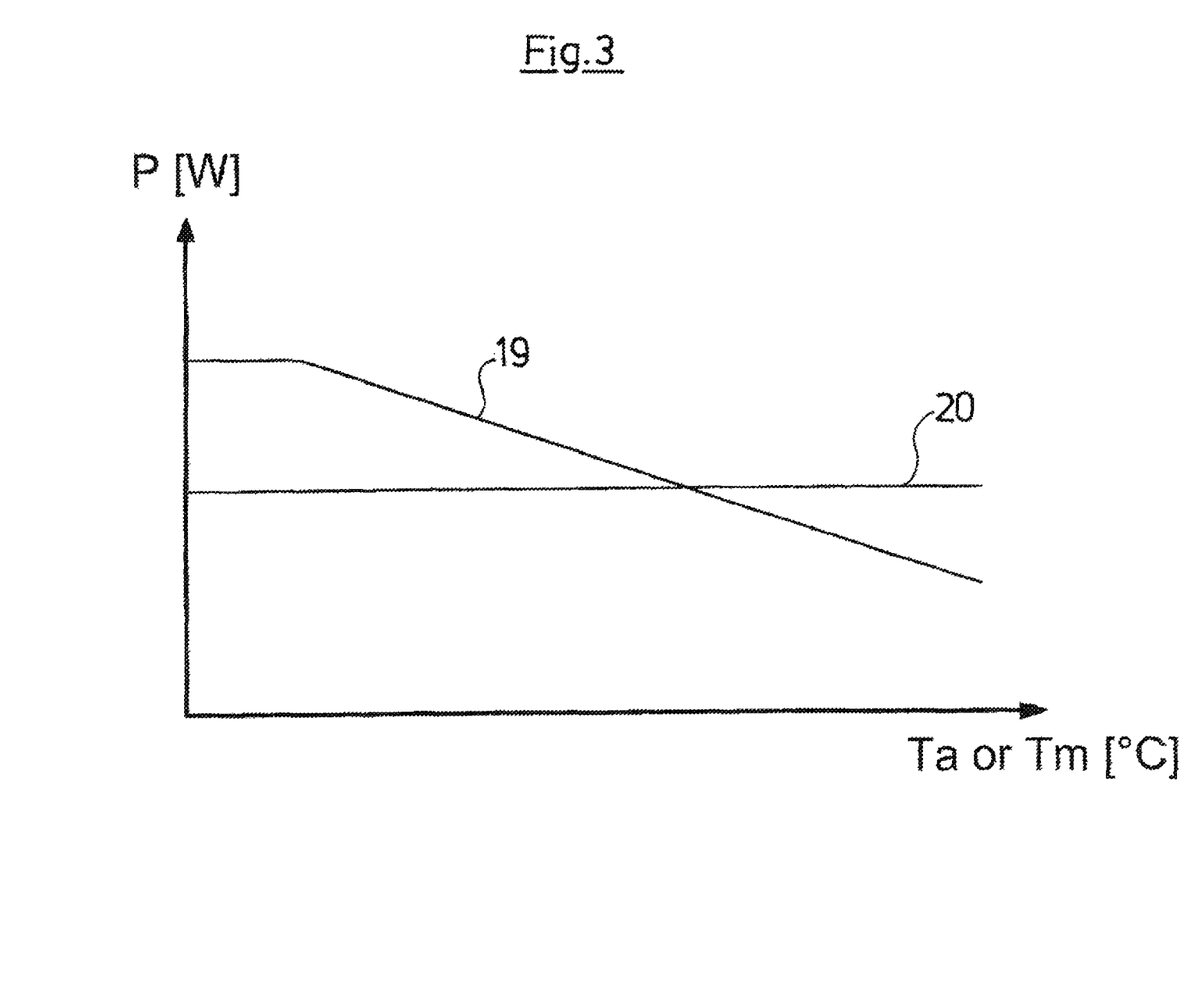
FIG. 3 is a graph of a temperature controlled power limit implemented in a pump device shown in FIG. 1A and FIG. 1B.
Figure 4A:
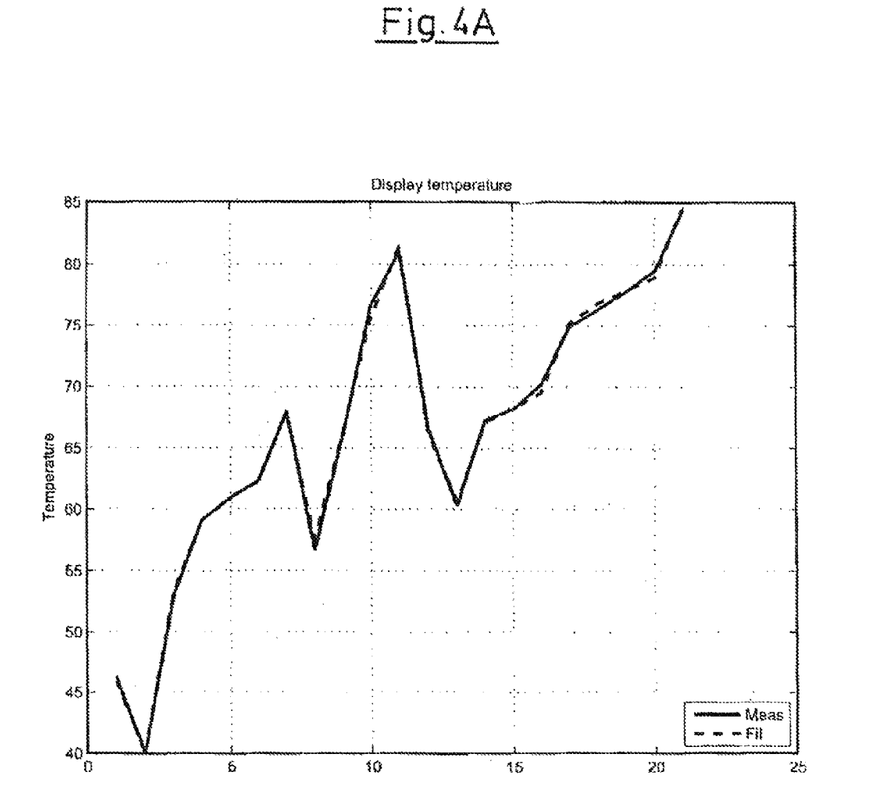
FIG. 4A is a graph illustrating the goodness of fit of the thermal model implemented in the pump device shown in FIG. 1A and FIG. 1B.
Figure 4B:
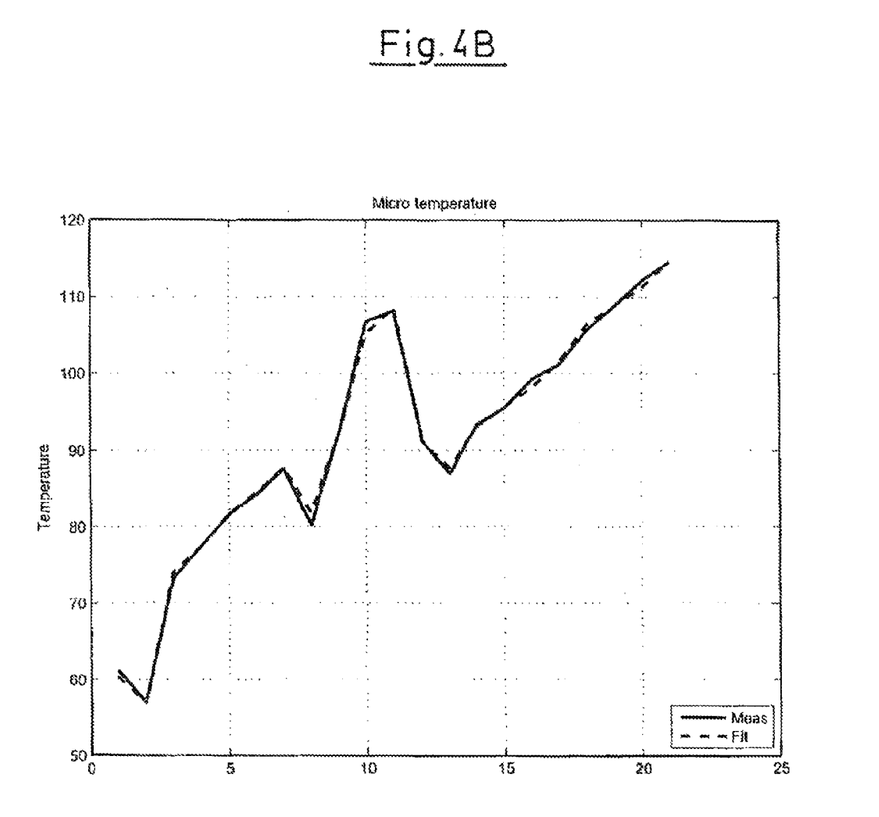
FIG. 4B is another graph illustrating the goodness of fit of the thermal model implemented in the pump device shown in FIG. 1A and FIG. 1B.
Figure 4C:
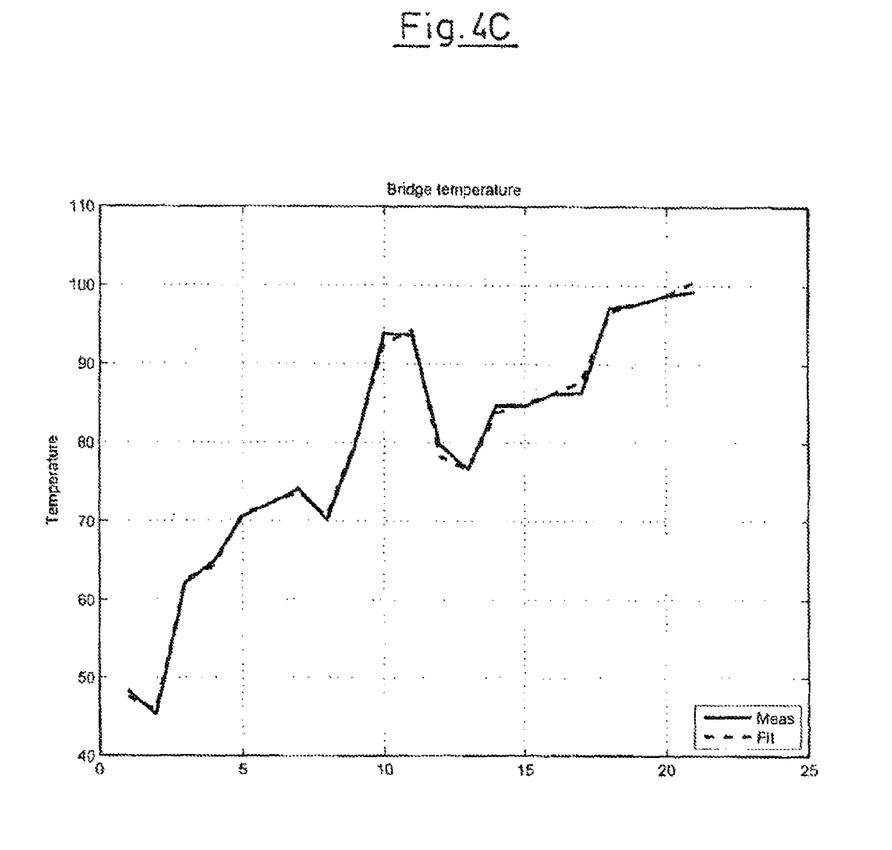
FIG. 4C is another graph illustrating the goodness of fit of the thermal model implemented in the pump device shown in FIG. 1A and FIG. 1B.
Figure 4D:
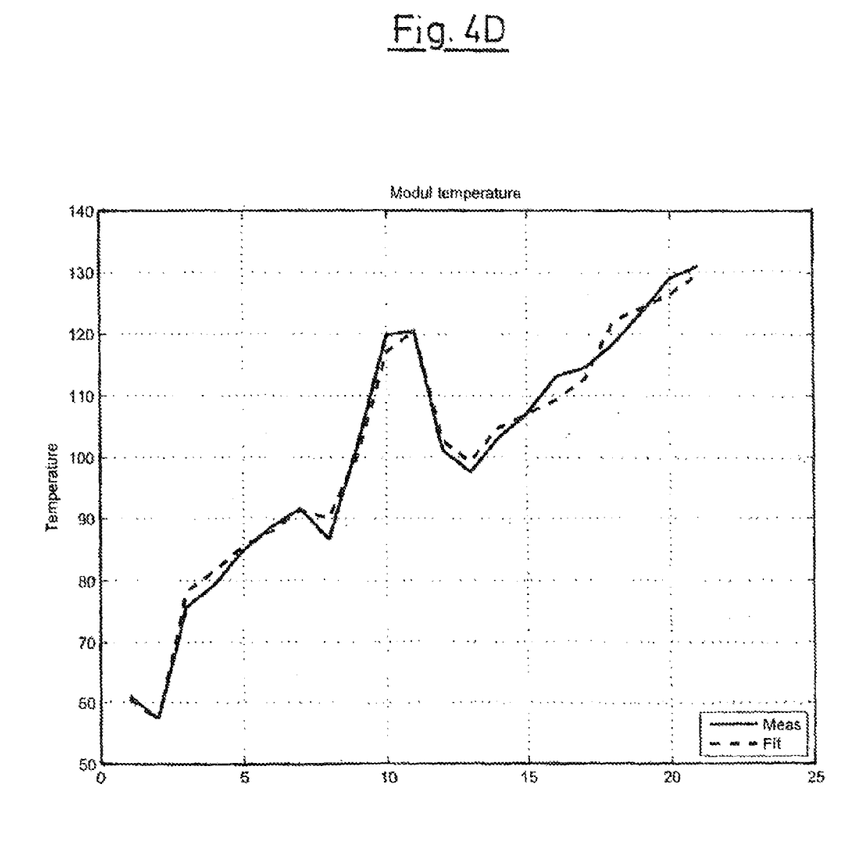
FIG. 4D is another graph illustrating the goodness of fit of the thermal model implemented in the pump device shown in FIG. 1A and FIG. 1B.

FIG. 3 shows a graph of a temperature controlled power limit indicated by reference numeral 19 implemented in a pump device 1 shown in FIG. 1A and FIG. 1B in comparison to a nominal power limit indicated by reference numeral 20.

The temperature controlled power limit 19 is determined as follows. The media temperature $T_m$ and the ambient temperature $T_a$ which are measured by temperature sensors as shown in FIG. 1B form the basis for the development of a mathematical model, namely, the thermal model which expresses the temperature of the electronic components shown in FIG. 2 as a function of the measured temperatures $T_a$ and/or $T_m$ indicated on the x-axis of the graph, the intermediate voltage $V_{DC}$, the intermediate power $P_{DC}$, the display state $X_D$ of a display which is either turned on or turned off (1 or 0). Thus, based on steady state measurements of the temperatures and the power consumption, it is possible to express the temperature of an electronic component comp1, for example, the temperature of the liquid crystal display (LCD) 16, as $T_{comp1}=f1(P_{DC}, V_{DC}, T_m, T_a, X_D)$. As mentioned above, a special case which is well suited for embedded implementation may be expressed by the following temperature model:

$$T_{comp1}=a_1 T_a+a_2 T_m+a_3 P_{DC}+a_4 V_{DC}+a_5 X_D$$

wherein $a_1 \ldots a_5$ are temperature model coefficients.

Temperature models for selected components, shown for example in FIG. 2, may be expressed as follows:

$$T_{LCD\ Display}=0.28 \cdot T_a+0.27 \cdot T_m+0.70 \cdot P_{DC}+5.61 \cdot X_D+0.052 \cdot V_{DC}$$

$$T_{microcontroller}=0.47 \cdot T_a-0.50 \cdot T_m+0.49 \cdot P_{DC}+3.39 \cdot X_D+0.11 \cdot V_{DC}$$

$$T_{bridge}=0.43 \cdot T_a+0.51 \cdot T_m+0.62 \cdot P_{DC}+1.62 \cdot X_D+0.051 \cdot V_{DC}$$

$$T_{module}=0.68 \cdot T_a+0.78 \cdot T_m+0.17 \cdot P_{DC}+3.43 \cdot X_D+0.096 \cdot V_{DC}.$$

During operation of the centrifugal pump $P_{DC}$, $V_{DC}$, $T_a$ and $T_m$ are measured as mentioned above, and the maximum power limit is calculated whereby it is ensured that the temperatures for the critical or selected components will not exceed their limits. Thereby, when the ambient and media temperatures are low, then the power limit 10 (y-axis of the graph) is raised above the nominal power limit 20. When the media and ambient temperatures are high, the power limit 19 is lowered below the nominal power limit 20.

In practice, the adjustment of the power limit 19 may be carried out as follows. Since the power limit 19 is the same physical variable as the power consumption in the intermediate circuit $P_{DC}$, i.e., a critical temperature may be calculated for determining a temporary power limit by using the equation below:

$$P_{lim}=P_{DC}=(T-a_1*T_a-a_2*T_m-a_4*V_{DC}-a_5*X_D-a_5*X_I)/a_3$$

wherein $P_{DC}$ is the power consumption of the intermediate circuit.

Assuming that there are different estimated critical component temperatures $T_1, T_2 \ldots T_X$, then there are also different maximum critical component temperatures $T_{1max}$, $T_{2max}$, $T_{Xmax}$. In a thermal monitoring task implemented in the control unit, all estimated temperatures are then compared to their maximum temperature. Thus, if all estimated temperatures are below their corresponding maximum temperature, a calculation can be carried out for a new power limit for all components by the following equation:

$$P_{lim}=P_{DC}=(T_{1max}-a_1*T_a-a_2*T_m-a_4*V_{DC}-a_5*X_D-a_5*X_I)/a_3.$$

Then, the minimum value of all $P_{lim}$ found is chosen as a new reference for the power limit 19.

If, however, one or more estimated temperatures are above their corresponding maximum temperature, a calculation of a new power limit can be carried out for these components using again the following equation already indicated above:

$$P_{lim}1=(T_{1max}-a_1*T_a-a_2*T_m-a_4*V_{DC}-a5*X_D-a5*X_I)/a3.$$

Also in this case, the minimum value of all $P_{lim}$ found is chosen as the new reference for the power limit 19.

To ensure a robust implementation of the temperature controlled power limit 19, the following error handling mechanisms can be implemented:
1) the increase of the power limit time is limited
2) redundancy in the measurement of media and ambient temperatures
3) fault diagnosis in the pump control software (e.g., plausibility check and variance analysis) is introduced.

FIG. 4A, FIG. 4B, FIG. 4C, FIG. 4D show respective graphs illustrating the goodness of fit of the thermal model implemented in the pump device shown in FIG. 1A and FIG. 1B wherein the solid lines respectively indicate measurement results and the dashed lines indicate a corresponding fitted curve. The graphs shown in FIG. 4A refer to temperatures (measured/fitted) of the LCD 16, the graphs in FIG. 4B refer to temperatures (measured/fitted) of the microcontroller 17, the graphs in FIG. 4C refer to temperatures (measured/fitted) of the rectifier bridge 13, and the graphs in FIG. 4D refer to temperatures (measured/fitted) of the power module 15 shown in FIG. 2.

While specific embodiments of the invention have been shown and described in detail to illustrate the application of the principles of the invention, it will be understood that the invention may be embodied otherwise without departing from such principles.

APPENDIX

Reference Numerals 1 pump device
2 arrow
3 housing
4 inlet
5 outlet
6 rotor can
7 control box
8 printed circuit board
9 air
10 measurement point
11 top side of rotor can
12 bottom side of rotor can
13 rectifier bridge
14 dual temperature sensor
15 power module
16 liquid crystal display (LCD)
17 microcontroller
19 power limit
20 nominal power limit

What is claimed is:

1. A method for controlling the power limit of a pump device, the method comprising the steps of:
   providing the pump device with a control box;
   measuring a pump media temperature and measuring an ambient temperature inside the control box of the pump device;
   controlling the power limit of the pump device on the basis of the pump media temperature and the ambient temperature measured inside the control box of the pump device;
   storing a thermal model in the control box, which relates temperatures of one or more temperature critical pump components to pump media temperature and ambient temperature inside the control box; and
   determining with the control box, using the measured pump media temperature and the measured ambient temperature, temperatures of the one or more temperature critical pump components in the pump device.

2. A method according to claim 1, wherein:
   the control box is provided with electronic components; and
   the temperature critical pump components of the pump device comprise the electronic components.

3. A method according to claim 1, wherein the power limit of the pump device is controlled such that if the temperature of all temperature critical pump components of the pump device determined on the basis of the thermal model are below their maximum temperature, the input power limit of the pump device is at least temporarily raised above a nominal power limit.

4. A method according to claim 2, wherein the power limit of the pump device is controlled such that if the temperature of one or more pump critical components of the pump device determined on the basis of the thermal model is/are above its/their maximum temperature, the input power limit is at least temporarily reduced below a nominal power limit.

5. A method according to claim 1, wherein in-power and/or out-power related quantities and/or loss related states of the one or more temperature critical pump components in the pump device are used as input for the thermal model.

6. A method according to claim 1, wherein the thermal model is expressed by $$T_{comp1}=a_1T_a+a_2T_m+a_3P_{DC}+\theta_{in}\cdot Y_{in}+\theta_{out}\cdot Y_{out}+\theta_C X_C$$

wherein:
   $T_a$ is the measured ambient temperature;
   $T_m$ is the measured media temperature;
   $a_1 \ldots a_3$ are temperature model coefficients;
   $P_{DC}$ is the power consumption in the intermediate circuit;
   $\theta_{in}$ is a vector of coefficients related to $Y_{in}$;
   $\theta_{Out}$ is a vector of coefficients related to $Y_{out}$;
   $Y_{in}$ is a vector of input related quantities;
   $Y_{out}$ is a vector of output related quantities;
   $X_C$ is a vector of component states; and
   $\theta_C$ is a vector of coefficients related to $X_C$.

7. A method according to claim 6, wherein the media and ambient temperature measurements are steady state measurements.

8. A method according to claim 6, wherein the model structure of the thermal model is expressed by $$T=a_1T_a+a_2T_m+a_3P_{DC}+a_4V_{DC}+a_5\cdot X_D+a_6\cdot X_I$$

wherein:
   T is the temperature of the one or more components;
   $a_1$-$a_6$ are temperature model coefficients;
   $T_a$ is the ambient temperature;
   $T_m$ is the media temperature;
   $P_{DC}$ is the power consumption in the intermediate circuit,
   $V_{DC}$ is the intermediate circuit voltage
   $X_D$ is the display state vector and
   $X_I$ is the inverter state vector.

9. A method according to claim 2, wherein the model structure of the thermal model is expressed by $$T=a_1T_a+a_2T_m+a_3P_{DC}+a_4V_{DC}+a_5\cdot X_D+a_6\cdot X_I$$

wherein:
   T is the temperature of the one or more components;
   $a_1$-$a_6$ are temperature model coefficients;
   $T_a$ is the ambient temperature;
   $T_m$ is the media temperature;
   $P_{DC}$ is the power consumption in the intermediate circuit,
   $V_{DC}$ is the intermediate circuit voltage
   $X_D$ is the display state vector and
   $X_I$ is the inverter state vector.

10. A centrifugal pump device comprising:
   a motor;
   a control box, the motor being controlled by the control box;
   a temperature sensor device for measuring a pump media temperature and an ambient temperature, the temperature sensor device being arranged in the control box, wherein:
   the control box controls a power limit of the pump device on the basis of the pump media temperature and the ambient temperature measured inside the control box of the pump device;
   a thermal model is programmed in the control box which relates temperatures of one or more temperature critical pump components to pump media temperature and ambient temperature inside the control box; and
   the control box uses the thermal model to determine temperatures of one or more pump in the pump device as a function of the measured pump media temperature and the measured ambient temperature.

11. A pump device according to claim 10, wherein the one or are electronic components.

12. A pump device according to claim 10, wherein in-power and out-power related quantities and/or loss related states of one or more components in the pump device are used as input for the thermal model.

13. A pump device according to claim 10, wherein the control box control is adapted to control the power limit of the pump device such that if a temperature of all temperature critical pump components determined on the basis of the thermal model are below a corresponding maximum temperature, the input power limit of the pump device is at least temporarily raised above a nominal power limit.

14. A pump device according to claim 10, wherein the control box is adapted to control the power limit of the pump device such that if a temperature of the one or more pump critical components determined on the basis of the thermal model is/are above a corresponding maximum temperature, the input power limit of the pump device is at least temporarily reduced below a nominal power limit.

15. A pump device according to claim 10, wherein the pump device further comprises an electronic frequency converter.

16. A pump device according to claim 10, wherein the model structure of the thermal model is expressed by:

$$T=a_1T_a+a_2T_m+a_3P_{DC}+a_4V_{DC}+a_5\cdot X_D+a_6\cdot X_I$$

wherein:
- T is the temperature of the one or more components;
- $a_1$-$a_6$ are temperature model coefficients;
- $T_a$ is the ambient temperature;
- $T_m$ is the media temperature;
- $P_{DC}$ is the power consumption in the intermediate circuit,
- $V_{DC}$ is the intermediate circuit voltage
- $X_D$ is the display state vector and
- $X_I$ is the inverter state vector.

17. A centrifugal pump device comprising:
   a motor;
   a control box with electronic components, the motor being controlled by the control box;
   a control box temperature sensor arrangement comprising at least one temperature sensor, the temperature sensor arrangement being arranged inside of the control box and the temperature sensor arrangement measuring a media temperature of media outside of the control box and also measuring an ambient temperature within the control box, wherein:
   the control box controls a power limit of the pump device on the basis of the pump media temperature and the ambient temperature measured inside the control box of the pump device;
   a thermal model is programmed in the control box, wherein the thermal model provides temperatures of one or more temperature critical pump components as a function of pump media temperature and ambient temperature inside the control box; and
   the control box uses the thermal model to determine temperatures of one or more pump in the pump device as a function of the measured media and the measured ambient temperature, wherein the one or more pump components comprise at least one of the electronic components.

18. A pump device according to claim 17, further comprising a pump housing through which the media flows, wherein the sensor arrangement comprises a dual temperature sensor mounted inside the control box for measuring the media temperature of the media flowing through the pump housing and measuring the ambient temperature within the control box.

19. A pump device according to claim 17, wherein:
   the control box control is adapted to control the power limit of the pump device such that if a temperature of all temperature critical pump components determined on the basis of the thermal model are below a corresponding maximum temperature, the input power limit of the pump device is at least temporarily raised above a nominal power limit; and
   the control box is adapted to control the power limit of the pump device such that if a temperature of the one or more pump critical components determined on the basis of the thermal model is/are above a corresponding maximum temperature, the input power limit of the pump device is at least temporarily reduced below a nominal power limit.

20. A pump device according to claim 17, wherein a model structure of the thermal model is expressed by:

$$T = a_1 T_a + a_2 T_m + a_3 P_{DC} + a_4 V_{DC} + a_5 \cdot X_D + a_6 \cdot X_I$$

wherein:
- T is a temperature of the one or more components;
- $a_1$-$a_6$ are temperature model coefficients;
- $T_a$ is the ambient temperature;
- $T_m$ is the media temperature;
- $P_{DC}$ is a power consumption in the intermediate circuit,
- $V_{DC}$ is an intermediate circuit voltage
- $X_D$ is a display state vector; and
- $X_I$ is an inverter state vector.

* * * * *